United States Patent
Achten et al.

(10) Patent No.: US 8,765,842 B2
(45) Date of Patent: Jul. 1, 2014

(54) METHOD FOR PRODUCING POLYMERIC SOLIDS

(75) Inventors: Dirk Achten, Leverkusen (DE); Peter Kueker, Köln (DE); Jürgen Kempkes, Köln (DE); Bianka Lorenz, Halle (DE); Werner Obrecht, Moers (DE); Annika Stobrawe, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 298 days.

(21) Appl. No.: 13/256,820

(22) PCT Filed: Mar. 17, 2010

(86) PCT No.: PCT/EP2010/001658
§ 371 (c)(1),
(2), (4) Date: Dec. 22, 2011

(87) PCT Pub. No.: WO2010/105805
PCT Pub. Date: Sep. 23, 2010

(65) Prior Publication Data
US 2012/0101216 A1    Apr. 26, 2012

(30) Foreign Application Priority Data
Mar. 17, 2009   (EP) .................................... 09003792

(51) Int. Cl.
*C08C 1/08*    (2006.01)

(52) U.S. Cl.
USPC ............................ 523/335; 528/483; 528/490

(58) Field of Classification Search
CPC ................. C08C 1/14; C08C 1/15; C08J 3/16
USPC .................................. 523/335; 528/483, 490
See application file for complete search history.

(56) References Cited

U.S. PATENT DOCUMENTS

| | | |
|---|---|---|
| 4,521,576 A | 6/1985 | Musch et al. |
| 7,816,411 B2 | 10/2010 | Tonkovich et al. |
| 2002/0002217 A1 | 1/2002 | McCleskey et al. |
| 2006/0073080 A1 | 4/2006 | Tonkovich et al. |
| 2007/0265374 A1* | 11/2007 | Jahn et al. .................. 524/62 |
| 2008/0160203 A1 | 7/2008 | O'Leary et al. |
| 2010/0068366 A1 | 3/2010 | Tonkovich et al. |

FOREIGN PATENT DOCUMENTS

| | | |
|---|---|---|
| JP | 63095239 A2 | 6/1988 |
| WO | 2007060462 A1 | 5/2007 |
| WO | 2009015725 A1 | 2/2009 |

OTHER PUBLICATIONS

International Search Report dated May 26, 2010 for WO2010/105805.
Ullmann's Encyclopedia of Industrial Chemistry, 6th Edition, (Dec. 2002) vol. 13, pp. 75-108, and vol. 31, pp. 344-355, Wiley-VCH.

* cited by examiner

*Primary Examiner* — Edward Cain
(74) *Attorney, Agent, or Firm* — Jennifer R. Seng

(57) ABSTRACT

The invention relates to a method for producing polymeric solids free of auxiliary emulators starting from polymer latices (dispersion), wherein a polymer dispersion with a starting ph-value greater than 9 is set to a ph-value of 6 to 9 by adding gaseous carbon dioxide and the polymer dispersion is subsequently coagulated by shearing and/or freezing.

7 Claims, No Drawings

METHOD FOR PRODUCING POLYMERIC SOLIDS

The invention relates to a method for producing polymeric solids that are free of auxiliary emulsifiers, to polymeric solids that are free of auxiliary emulsifiers, and to the use thereof in the production of vulcanised rubbers and adhesives.

The production of polychloroprene has been known for a long time. It is carried out by emulsion polymerisation in an alkaline aqueous medium, as described, for example, in "Ullmanns Encyclopädie der technischen Chemie", Volume 9, p. 366, Verlag Urban. Based thereon, there is a large number of publications relating to the prior art for changing the composition of the polymers, such as, for example, (block) copolymerisation, functionalisations and polymer-analogous reactions such as hydrolysis and grafting, and for producing blends in solid or latex forms and blending with other products such as fillers, stabilisers, plasticisers, and creaming and crosslinking agents.

The continuous emulsion polymerisation of chloroprene is known from DE 3 002 711.

Following the polymerisation, the resulting anionically stabilised polymer dispersions (the term dispersion is used synonymously with latex or polymer latex hereinbelow) are subjected to coagulation in order to produce solids.

It is further prior art that polymer dispersions stabilised by resin or fatty acids are not stable over a wide pH range because the resin acid salts and/or fatty acids used as the principal emulsifiers are no longer available as active emulsifiers as a result of conversion into their acid form.

Overall, polymer dispersions based on resin and fatty acids exhibit reduced storage, temperature, shear and transport stability at a pH value <10.

In order to stabilise the polymer dispersions over a wide pH range, it is necessary to use auxiliary emulsifiers. A disadvantage here is the amount of auxiliary emulsifiers to be determined. Although the polymeric dispersions are stable with an increased amount of auxiliary emulsifiers at reduced pH, the polymeric solids are then freeze-thaw stable, which is undesirable.

The industrially conventional process of freeze coagulation uses a water-soluble organic or inorganic acid diluted with a large amount of water for the purpose of reducing the pH to a pH value <9. In order that the latex does not precipitate at that pH value, small amounts of auxiliary emulsifiers must be present. The destabilised products so obtained are conventionally deposited continuously on a freeze coagulation roller and continuously scraped off the roller in the form of a foil, following which they are washed copiously in order to remove excess salts and acids and finally dried in a vertical or horizontal oven. The entire processing process is carried out according to a continuous procedure.

A common feature of all these processes of the prior art is that either expensive processes which consume large amounts of water must be used to remove auxiliary emulsifiers, salts and organic acids from the precipitation process, or the resulting product is often of low quality, for example exhibits increased swelling in water, an increased VOC concentration, poorer ageing stability, higher colour indices, or vulcanisation behaviour which deviates from the standard, because the product is encumbered with the remaining salt and acid load. A further disadvantage in the pH reduction is dilution and uncontrolled precipitation of the products, which are extremely tacky in this state, with the resulting necessity for frequent and complex cycles for cleaning the precipitation systems.

Polychloroprene is either used in the production of industrial rubber articles, after appropriate compounding and vulcanisation, or it is used as a raw material for (contact) adhesives.

The object was, therefore, to develop a method which, as far as possible, does not exhibit the above-mentioned disadvantages, and to provide a product of improved quality according to the above criteria.

Accordingly, the present application provides a method for producing polymeric solids that are free of auxiliary emulsifiers starting from polymer latices, wherein the polymer dispersion having a starting pH value greater than 9 is adjusted to a pH value of from 6 to 9 by addition of gaseous carbon dioxide and the polymer dispersion is subsequently coagulated by shear and/or freezing out.

The terms polymer latex, polymer dispersion, latex, dispersion and chloroprene latex are used as synonyms.

Surprisingly, it has now been found that polymer latices produced with a pH >9 can advantageously be adjusted to a pH value of from 6 to 9, depending on the processing method, by the addition of gaseous carbon dioxide.

The polymerisation of chloroprene or the copolymerisation of chloroprene is conventionally carried out with suitable comonomers (including sulfur) as an emulsion polymerisation. Emulsifier mixtures are used for this purpose. Conventional emulsifier mixtures consist of resin acids with auxiliary emulsifiers or mixtures of fatty acids with auxiliary emulsifiers or resin acid/fatty acid mixtures with auxiliary emulsifiers.

As resin acids there can be used modified or unmodified (natural) resin acids. Modified resin acids are obtained by dimerisation, disproportionation, hydrogenation and modification of resin acid mixtures which contain abietic acid, neoabietic acid, palustric acid, levopimaric acid. A particularly preferred modified resin acid is disproportionated resin acid (Ullmann's Encyclopedia of Industrial Chemistry, 6th Edition, Volume 31, p. 345-355).

Fatty acids contain from 6 to 22 carbon atoms per molecule. They can be fully saturated or can also contain one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as, for example, castor oil, cottonseed, groundnut oil, linseed oil, coconut oil, palm kernel oil, olive oil, rape oil, soybean oil, fish oil and beef tallow, etc. (Ullmann's Encyclopedia of Industrial Chemistry, 6th Edition, Volume 13, p. 75-108). Preferred carboxylic acids are derived from coconut fatty acid and from beef tallow and are partially or fully hydrogenated.

Preference is given to the Li, Na, K and ammonium salts of natural or disproportionated abietic acid and of partially hydrogenated tallow fatty acid and of mixtures thereof.

The modified resin acids, fatty acids or mixtures of resin/fatty acid are used in an amount of from 0.2 to 15 parts by weight, preferably from 0.5 to 12.5 parts by weight, particularly preferably from 1.0 to 10 parts by weight, based on 100 parts by weight of the monomer mixture.

Auxiliary emulsifiers are sulfonates, sulfates and phosphates which are bonded to an organic radical. Suitable organic radicals are aliphatic, aromatic, alkylated aromatic compounds, condensed aromatic compounds, as well as methylene-bridged aromatic compounds, it being possible for the methylene-bridged and condensed aromatic compounds additionally to be alkylated. The length of the alkyl chains is from 6 to 25 carbon atoms. The length of the alkyl chains bonded to the aromatic compounds is from 3 to 12 carbon atoms.

The sulfates, sulfonates and phosphates are used in the form of lithium, sodium, potassium and ammonium salts. The sodium, potassium and ammonium salts are preferred.

Examples of such sulfonates, sulfates and phosphates are Na lauryl sulfate, Na alkyl sulfonate, Na alkylaryl sulfonate, Na salts of methylene-bridged aryl sulfonates, Na salts of alkylated naphthalene sulfonates as well as the Na salts of methylene-bridged naphthalene sulfonates, which can also be oligomerised, the degree of oligomerisation being from 2 to 10. The alkylated naphthalenesulfonic acids and the methylene-bridged (and optionally alkylated) naphthalenesulfonic acids are usually in the form of isomeric mixtures, which can also contain more than 1 sulfonic acid group (from 2 to 3 sulfonic acid groups) in the molecule. Particular preference is given to Na lauryl sulfate, Na alkyl sulfonate mixtures having from 12 to 18 carbon atoms, Na alkylaryl sulfonates, Na diisobutylenenaphthalene sulfonate, methylene-bridged polynaphthalene sulfonate mixtures and methylene-bridged aryl sulfonate mixtures.

Auxiliary emulsifiers are also addition products of ethylene oxide, propylene oxide and also ethylene oxide/propylene oxide mixtures with compounds having sufficiently acidic hydrogen. These include, for example, phenol, alkylated phenol and alkylated amines. The mean degrees of polymerisation of the epoxides are from 2 to 20. Examples of neutral emulsifiers are ethoxylated nonylphenols having 8, 10 and 12 ethylene oxide units.

It has been found, surprisingly, that polymer dispersions prepared by emulsion polymerisation of chloroprene and of chloroprene mixtures with suitable comonomers without the use of the above-mentioned auxiliary emulsifiers can be adjusted to a pH value of from 6 to 9 by the method according to the invention and subsequently coagulated, for example by freezing out.

The pH value adjustment is preferably between 7 and 8.

The polymer latices usually have a solids concentration of from 20 to 40 wt. %, based on 100 wt. % of chloroprene used.

Preferred polymer latices are anionically stabilised polychloroprene dispersions in which the proportion of polymerised chloroprene in the solid matter of the dispersion as a whole is >50%.

The polymer dispersion is preferably prepared by means of a continuous polymerisation without the addition of auxiliary emulsifiers.

The polymer latices produced according to the invention can thereby be processed to solids without any losses in terms of quality while saving >10%, preferably >20%, particularly preferably >30% of the washing water otherwise required.

The polymer latices produced according to the invention exhibit a >5%, preferably >15%, particularly preferably >30% lower contamination tendency in the processing process as compared with conventional neutralisation processes.

By using carbon dioxide as the destabilising agent it is possible to process solids concentrations in the polymer dispersion that are >2%, preferably >5%, particularly preferably >10% higher than is currently conventional while retaining a lower contamination tendency and a lower requirement in terms of washing water, as a result of which production efficiency increases of >5%, preferably >10%, particularly preferably >15% in the space-time yield of solid are possible.

Because smaller amounts of washing water are required, the water content of the polymer films frozen out in the freeze coagulation process is automatically reduced, as a result of which the necessary energy used for the process of drying the films containing >40% water per kg of solid product is reduced by >5%, preferably >10%, particularly preferably 15%.

By reducing the energy required to dry the products, the products exhibit less discolouration compared with products produced in the conventional manner; alternatively, the belt speed in the drying oven can be increased with the same energy input.

By the use of smaller amounts of energy, the formation of so-called tar spots from resin condensation and oxidation during drying in the drier is reduced, resulting in both an improvement in the colour quality of the end product, which is typically impaired by dripping of the condensed tar spots onto the end product, and a reduced necessity for complex and expensive cleaning of the drier.

For the pH adjustment, acids known from the prior art, such as, for example, acetic acid, phosphoric acid and sulfuric acid, in dilute aqueous solution are used, so that the water consumption when these acids are used is higher than when carbon dioxide is used.

The amount of acid required in the case of the use of carbonic acid by means of the introduction of gaseous carbon dioxide into the aqueous dispersion is markedly smaller than in the case of all the organic and inorganic acids described for this process. In addition, the water solubility of the products and volatility of the unreacted acid are markedly higher.

Carbon dioxide can be introduced as a gas in up to 100% form, as a result of which dilution of the polymer dispersion is avoided. Furthermore, the pH value adjustment takes place more precisely and more uniformly in the polymer dispersion as a whole, and local overconcentrations, which lead to premature coagulate formation and contamination, are largely avoided.

The use of gaseous carbon dioxide is further advantageous because neither organic acids, with the risk of a VOC and odour potential, such as acetic acid which is mainly used for this purpose, nor inorganic acids, which need to be diluted considerably (e.g. $HCl$, $HNO_3$, $H_2SO_4$, $H_3PO_4$), are required.

The residues of the neutralisation with carbon dioxide are the sodium and potassium salts thereof, which have outstanding solubility in water and are for the most part washed out in the extremely small amounts used of from 0.5 to 15 g $CO_2$, preferably from 2 to 12 g $CO_2$, particularly preferably from 4 to 10 g $CO_2$/kg of polymeric solid, are for the most part washed out and in residual amounts of <5 g, preferably <2 g, particularly preferably <1 g, as sodium and potassium carbonates/kg of solid, do not adversely affect the product properties, even with a reduced amount of washing water.

During conventional processing by freezing out, some of the surface-active auxiliary emulsifiers are removed from the polymer and pass into the waste water. If the emulsifiers are not biodegradable, cost-intensive processes must be used to purify the water again.

On the one hand the products conventionally used as auxiliary emulsifiers are not biodegradable; on the other hand they cause a certain discolouration of the polymer, as a result of which its use as an adhesive for light-coloured materials becomes unattractive.

As a result of the method according to the invention, the use of auxiliary emulsifiers is no longer necessary, so that the waste water is less contaminated. The polymeric solid has markedly less discolouration.

By means of carbon dioxide it is advantageously possible both to destabilise polychloroprene dispersions for the freezing-out process and to coagulate dispersions and precipitate them under shear, in order to feed them to a dewatering screw.

It has been found, surprisingly, that the waste water separated off after the coagulation contains fewer impurities. The COD value is significantly lower than in conventional processes for the production of polymeric solids using acetic acids to adjust the pH value to from 6 to 9.

The COD value is a measure of the amount of low molecular weight constituents, in particular the auxiliary agents, for example auxiliary emulsifiers and acetic acid, used in the polymerisation and in subsequent process steps, that is present in the latex serum after freeze coagulation. The higher the COD value of the latex serum (waste water) in coagulation tests, in which latices having the same solids contents are used, the higher the content of impurities in the latex serum (waste water).

Carbon dioxide can further be used to produce polychloroprene powder inexpensively and efficiently in a spray drying process, wherein the carbon dioxide is not only passed into the stream of the polymer dispersion but, if required, can additionally also constitute the atmosphere in the spray tower.

An additional advantage of the use of carbon dioxide is that it is obtained from carbon dioxide-neutral sources and, by use, is partly converted into a bound form, whereby a positive carbon dioxide balance is obtained.

Excess carbon dioxide can pass out of the product in the method according to the invention. Because of the small amounts used and the non-combustibility of the carbon dioxide, there is no risk to the environment or the production staff.

In the method according to the invention, carbon dioxide can also be used in combination with other organic and inorganic acids, the amount of carbon dioxide used in the method not falling below 1 g, preferably 2 g, particularly preferably 3 g/kg of polymeric solid.

The present invention also provides polymeric solids that are free of auxiliary emulsifiers, obtainable by the method according to the invention.

The polymeric solids produced by the method according to the invention have a residual content of acetic acid, or the sodium or potassium salt of acetic acid, in the end product of <1000 ppm, preferably <500 ppm, particularly preferably <100 ppm, in so far as that acid has additionally been used.

The polymeric solids produced by the method according to the invention contain an amount consisting of the sum of sodium and potassium carbonate in the resulting polymeric solid of from >5 to <20,000 ppm, preferably from >20 to <10,000 ppm and particularly preferably from >50 ppm to <5000 ppm.

In the method according to the invention, the introduction of the suitable amounts of carbon dioxide into the latex stream preferably takes place continuously. The carbon dioxide can be introduced by injection, as an overlayer, by means of static and dynamic mixing units counter-currently and/or co-currently or by any industrially known gas/liquid mixing process.

According to the invention, the online monitoring of the amount mixed in can be carried out either volumetrically via the carbon dioxide consumption or by measuring the pH of the polymer dispersion.

The introduction of carbon dioxide into the polymer dispersion is preferably so controlled that the yield of carbon dioxide for the neutralisation reaction is >20%, preferably <40%, particularly preferably >50%.

The mixing-in process of the method according to the invention is preferably carried out at local pressures at the point of introduction of <80 bar, preferably <60 bar, particularly preferably <20 bar.

The uncompounded polymeric solids, obtainable by the methods according to the invention, are used in the rubber and adhesives industry for the production of vulcanised rubbers and adhesives.

The method according to the invention is explained in greater detail below by means of examples.

A Basic Recipe

The preparation of the latices was carried out using the following basic recipe. All numerical data, unless indicated otherwise, are based on parts by weight per 100 parts by weight of chloroprene used.

TABLE 1

| | Recipe | | | |
|---|---|---|---|---|
| | Example 1 | Example 2* | Example 3 | Example 4* |
| Chloroprene | 100 | 100 | 100 | 100 |
| Constituents of the aqueous phase | | | | |
| Demineralised water | 100 | 100 | 100 | 100 |
| Disproportionated resin acid Na salt (dehydro-, dihydroabietic acid Na salt) | 3.5 | 3.5 | 3.5 | 3.5 |
| Condensation product as naphthalenesulfonic acid and formaldehyde (Na salt) sodium hydroxide | 1 | | 1.5 | |
| Activator (formamidinesulfinic acid, 2% aqueous solution) | 0.36 | 0.36 | | |
| Activator (potassium peroxodisulfate, 3% aqueous solution; sodium dithionite, 2% aqueous solution) | | | 0.38 | 0.38 |
| Analysis | | | | |
| pH value | 12.7 | 12.7 | 12.6 | 12.6 |
| Solids concentration (wt. %) | 31.6 | 31.4 | 31.5 | 31.6 |

The examples marked with asterisks correspond to the invention.

Examples 1 and 2 correspond to the recipe for a CR rubber type; Examples 3 and 4 correspond to the recipe for a rapidly crystallising CR adhesive type.

B Implementation of the Emulsion Polymerisations

The aqueous phase (1,257 g) and the monomer phase (1,200 g) were placed in a 4-liter reactor and rinsed with nitrogen. After heating the emulsion to 44° C. (Examples 1+2) or cooling to 10° C. (Examples 3+4), the polymerisation was started by addition of a small amount (20 ml) of 2% aqueous formamidine-sulfinic acid activator and carried out to a conversion of 65% by continuous further addition of the same solution. When the conversion was reached, the polymerisation was stopped by addition of 0.1 part of diethylhydroxylamine in the form of an aqueous solution (10%). The unreacted monomers were removed in vacuo with the aid of steam to a residual monomer content of about 800 ppm.

C Series of Tests of Latex Stability a) Destabilisation of Example 1 with acetic acid 200 g of the prepared latex were adjusted to a pH of 7.2 with 4.2 ml of acetic acid (20%), which resulted in immediate coagulation.

b) Destabilisation of Example 1 with $CO_2$ 200 g of the prepared latex were adjusted to a pH of 7.2 with 0.7 g of $CO_2$ and the stability of the latex was observed for a period of one week.

The results are shown in Table 2.

TABLE 2

Tests of latex stability

| | Example 1 | |
|---|---|---|
| | a) destabilised with acetic acid (20%) | b) destabilised with $CO_2$ |
| after addition | coagulation | stable |
| Day 1 | — | stable |
| Day 2 | — | stable |
| Day 3 | — | stable |
| Day 4 | — | stable |
| Day 5 | — | stable |
| Day 6 | — | stable |
| Day 7 | — | stable |

While destabilisation with acetic acid leads to immediate coagulation of the latex, the latex destabilised with $CO_2$ is stable over a period of at least one week without any visible change.

D Series of Tests of Destabilisation

Examples 1 to 4 were adjusted to a pH value of 7.2 as shown in Table 3 and then coagulated by means of cold. To that end, in each case 200 g of the latex were poured into an aluminium dish measuring 20×30 cm and frozen out at −78° C. The frozen-out skins (polymeric solids) were pressed mechanically after thawing and the resulting serums (waste water) were analysed in respect of their chemical oxygen demand.

The integral content of the soluble organic constituents present in the latex serum (waste water) is characterised by the COD value (chemical oxygen demand) of the latex serum. The COD value is determined in accordance with DIN 38 409, Part 41, H 41-1 and H 41-2. In the COD determination, organic constituents are oxidised quantitatively with strongly sulfuric potassium dichromate in the presence of a silver sulfate catalyst. The amount of unreacted potassium dichromate is then back-titrated with iron(II) ions. The COD value is stated in the DIN standard in the dimension $mg_{oxygen}$/liter of solution or in the dimension $g_{oxygen}$/liter of solution.

TABLE 3

Tests of destabilisation

| | Example 1 | Example 2* | Example 3 | Example 4* |
|---|---|---|---|---|
| Latex (g) | 1000 | 1000 | 500 | 500 |
| $CO_2$ (g) | | 3.22 | | 1.92 |
| Acetic acid (20%) (g) | 20 | | 9.5 | |
| Demineralised water (g) | | 16.4 | | 7.9 |
| Concentration (%) | 31.2 | 30.8 | 30.61 | 31.8 |
| COD ($gO_2$/l serum) | 14.7 | 9.7 | 22.5 | 8.66 |
| COD ($gO_2$/kg CR) | 32.4 | 21.8 | 51.0 | 18.6 |

The latices without auxiliary emulsifiers (Examples 2 and 4) exhibit markedly lower COD values than the corresponding latices containing auxiliary emulsifiers (Examples 1 and 3). The waste water from Examples 1 and 3 exhibits clear yellow discolouration, which is attributable to the addition of auxiliary emulsifiers. The waster water from Examples 2 and 4, on the other hand, is only slightly yellow to colourless. The same trend was also observed in the frozen-out polymeric solids according to the invention: the polychloroprenes from Examples 1 and 3 exhibit a yellowish discolouration, while the polychloroprenes from Examples 2 and 4 are almost colourless.

The method according to the invention accordingly makes it possible to omit a cost-intensive purification process for the waste water and, further, to produce colourless polychloroprenes, which is a considerable advantage for adhesives production in particular.

What is claimed is:

1. A method for producing polymeric solids free of auxiliary emulsifiers starting from polymer latices, comprising;
   providing a polymer dispersion having a starting pH value greater than 9,
   adjusting the starting pH value to an adjusted pH value of from 6 to 9 by addition of gaseous carbon dioxide and where the polymer dispersion is subsequently coagulated by shear and/or freezing out.

2. The method according to claim 1, wherein the adjusted pH value is between 7 and 8.

3. The method according to claim 2, wherein the polymer dispersion is an anionically stabilized polychloroprene dispersion in which the proportion of polymerized chloroprene in the solid matter of the dispersion as a whole is greater than 50%.

4. The method according to claim 2, wherein the polymer dispersion is prepared by means of a continuous polymerization of chloroprene without the addition of auxiliary emulsifiers.

5. The method according to claim 4, wherein the introduction of gaseous carbon dioxide is carried out continuously.

6. The method according to claim 5, wherein the introduction of gaseous carbon dioxide is controlled so that a yield of carbon dioxide from the adjusting step is greater than 20%.

7. The method according to claim 6, wherein the introduction of gaseous carbon dioxide is carried out at local pressures at the point of introduction of <80 bar.

* * * * *